United States Patent [19]
Fromson et al.

[11] Patent Number: 6,083,871
[45] Date of Patent: Jul. 4, 2000

[54] CATALYST STRUCTURE AND METHOD OF MANUFACTURE

[75] Inventors: Howard A. Fromson, Stonington; William J. Rozell, Vernon, both of Conn.

[73] Assignee: Howard A. Fromson, Stonington, Conn.

[21] Appl. No.: 09/281,833

[22] Filed: Mar. 30, 1999

[51] Int. Cl.[7] .............................. B01J 21/04; B01J 23/02
[52] U.S. Cl. ......................... 502/439; 502/350; 502/60; 502/355; 502/349; 502/178
[58] Field of Search ...................... 502/350, 60, 355, 502/349, 178, 439

[56] References Cited

U.S. PATENT DOCUMENTS 3,856,709 12/1974 Porta et al. .............................. 252/463
5,693,207 12/1997 Fromson et al. ........................ 205/112
5,833,931 10/1998 Fromson et al. ........................ 422/177

Primary Examiner—Steven P. Griffin
Assistant Examiner—Christina Ildebrando
Attorney, Agent, or Firm—Alix, Ristas & Yale, LLP

[57] ABSTRACT

A catalytic structure is formed by first partially embedding discrete, non-conductive particles into the surface of an aluminum substrate. Nodules of a catalyst metal are then electrodeposited onto the surface between the embedded particles. The non-conductive particles control the distribution of the electrodeposited nodules. The aluminum substrate may be anodized after embedding the particles and the particles themselves may possess catalytic activity thereby providing a dual catalyst structure.

13 Claims, 1 Drawing Sheet

CATALYST STRUCTURE AND METHOD OF MANUFACTURE

BACKGROUND OF THE INVENTION

The present invention relates to a catalyst structure and to the method of manufacturing the structure involving the formation of a catalyst surface on a metal substrate.

It is known to form catalytic surfaces on plates or other substrates for a wide variety of catalytic processes. Several prior art patents disclose the formation of catalyst surfaces on aluminum plates. U.S. Pat. Nos. 3,929,594 and 5,021,592 disclose aluminum substrates which have an unsealed porous anodic oxide layer on the substrate with a metal electrolytically deposited to form discrete metal islands having a root portion anchored in the pores of the oxide layer. It is disclosed that the plate can be a composite catalyst body by using a catalytically active metal to form the islands which then serves as a catalyst along with the catalytically active aluminum oxide layer on the substrate between the islands. Another prior art U.S. Pat. No. 5,693,207 discloses that islands, referred to therein as nodules, are formed from a first relatively inexpensive metal and then coated with a second more expensive catalyst metal. These prior art catalytic surfaces may exhibit dual catalytic activity considering both the catalytic metal islands or nodules and the catalytic activity of the anodic aluminum oxide layer.

An aspect of the prior art deposition of a metal onto the surface of a metal substrate is that there is little or no control on the distribution of the metal nodules which are formed. Metal substrates such as thin aluminum webs inevitably have microscopic parallel ridges which arise from the roll grind on the finishing rollers in the milling operations. The deposition of a metal on one surface of the metal web will take place along the top of the ridges on that surface rather than in the valleys as a natural result of the electrodeposition process. Continued deposition will only build up the deposits already started on the ridges with no deposition in the valleys. As a result, the nodules appear in rows corresponding to the roll grind and there is no control of the spacing and distribution of the nodules.

SUMMARY OF THE INVENTION

The present invention relates to a method of forming a catalyst surface on a metal substrate and the resulting catalytic structure. An object of the invention is to control the distribution of electrolytically deposited catalyst metal on a metal substrate. A more specific object is to form a catalyst structure comprising discrete, non-conductive particles embedded in the surface of a substrate and catalyst metal nodules electrolytically deposited on the substrate and distributed between the embedded particles. The substrate may be anodized prior to the deposition of the metal and the embedded particles may also possess catalytic activity.

DESCRIPTION OF THE PREFERRED EMBODIMENTS

Figure 1:
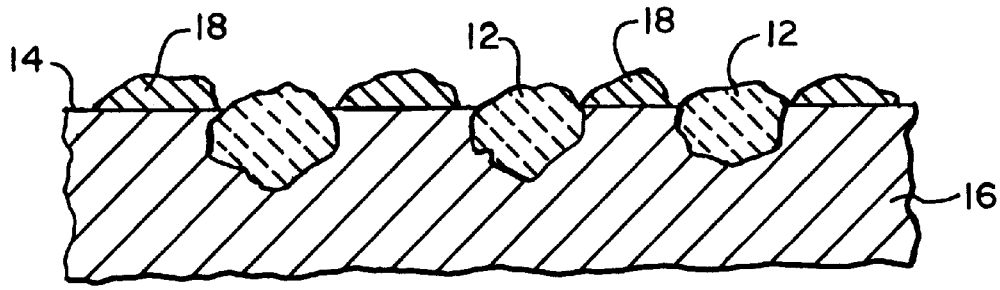
FIG. 1 is an enlarged cross-sectional view depicting particles embedded in the surface of an aluminum substrate and electrolytically deposited catalytic metal nodules on the surface between the embedded particles.

The first step in the process of the present invention is to embed particles into the surface of the metal substrate such that the particles will be permanently retained as an integral part of the surface of the substrate. The metal substrate can be any metal which is sufficiently ductile to permit the particles to be forged into the surface. Some examples are aluminum, mild carbon steel, galvanized steel, terneplate and aluminized steel. The criteria are that the particles be non-conductive, be capable of being forged into the metal and be non-poisonous to the metal catalyst. Although any particles which meet these criteria can be used such as titanium dioxide, zirconium dioxide, silicon carbide, etc., alumina is preferred. The particles preferably have a primary particle size of 0.1 to 2 microns. These particles are forced or forged into the metal surface by any one of several known techniques. An example is a forging operation using axially rotating rolls or brushes that contact the surface of the substrate in the presence of a slurry containing the particles to be embedded. The pressure of the rolls or brushes forcing the particles against the surface are adjusted so that there is sufficient force to cause the particles to be forged and partially embedded into the surface of the metal. In this forging process, the substrate metal is actually extruded or upset upwardly and partially wraps around the particles to trap them in place. Other methods of mechanically forging the particles into the metal surface can be used such as blasting techniques. FIG. 1 is a cross section illustrating the particles 12 partially embedded in the surface 14 of the substrate 16 and extending upwardly from the surface. The particles are preferably as small as practical. The particle size determines the size of the open spaces between particles. The smaller the particles, the smaller the open spaces and the greater the number of sites available for metal deposition between the particles.

The next step in the process is to electrolytically deposit a catalytic metal onto the substrate into the open spaces or interstices between the embedded particles so as to form the catalytic metal nodules 18 extending upwardly from the surface of the substrate. A conventional electro-deposition process is used and any metal can be used which has catalytic activity for a desired reaction and which can be electrodeposited. As one example, catalytic copper nodules can be formed by electrodeposition from a copper sulfate solution with the metal substrate as the cathode.

Figure 2:
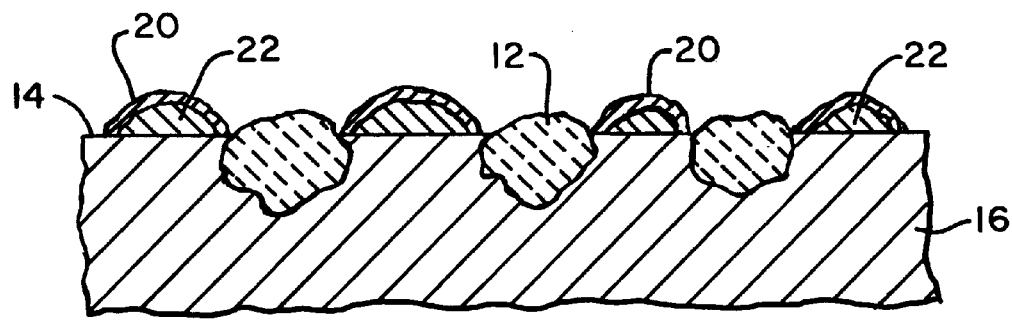
FIG. 2 is an enlarged cross-sectional view similar to FIG. 1 showing an alternate embodiment in which the nodules are formed with a first metal core and coated with a catalyst metal.

One alternative of the invention is to form the core of the metal nodules from a first, perhaps non-catalytic, metal and then coat the nodule core of the first metal with a second catalytic metal. The primary purpose of this alternative is to be able to form nodules with an expensive metal catalyst coating over an inexpensive metal core thereby reducing the cost. FIG. 2 illustrates this embodiment and shows the core metal 20 of the nodules and the catalyst metal 22 coated onto the nodules.

Figure 3:
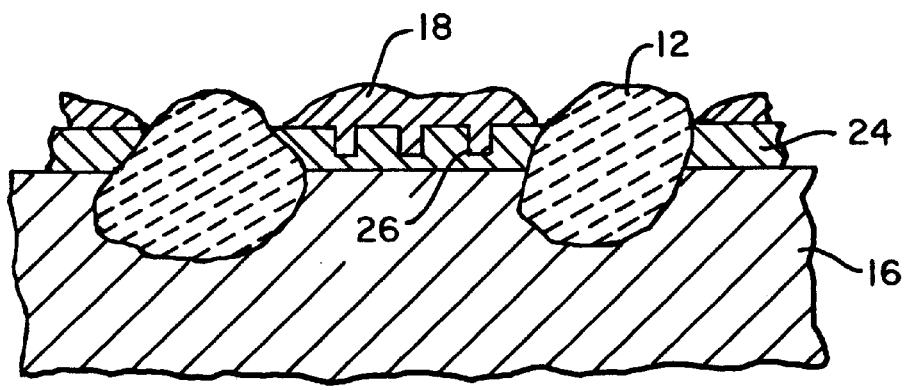
FIG. 3 is an enlarged cross-sectional view similar to FIG. 1 but where the aluminum substrate has a porous anodic oxide coating.

FIG. 3 illustrates the invention where the substrate such as aluminum has been anodized after the particles are embedded. As can be seen, the anodic oxide layer 24 is porous and the nodules 18 are anchored in the pores 26. The deposition of metals on an anodic oxide layer with root portions extending down into the pores is further described in U.S. Pat. No. 5,711,071. The advantages of having the anodic oxide layer are that it is a harder, more durable material than the bare substrate such as aluminum and that the deposited metal is anchored in the pores.

An additional feature of the invention is that the resultant catalytic structure can have dual catalytic properties. That is, the particles themselves may exhibit catalytic properties for particular reactions in addition to the catalytic properties of the deposited metal. For example, the catalytic materials used for the particles may include alpha alumina, titanium dioxide, zirconium dioxide, silicon carbide and zeolites, all of which are catalytic in certain situations.

What is claimed is:

1. A catalytic structure comprising:
   a. a metallic substrate having a surface;
   b. a plurality of non-conductive discrete particles embedded in said surface of said metallic substrate and extending above said surface; and
   c. a catalyst material comprising a plurality of metal nodules electrolytically deposited on said surface between said plurality of discrete particles and extending above said surface.

2. A catalytic structure as recited in claim 1 wherein said particles comprise aluminum oxide.

3. A catalytic structure as recited in claim 1 wherein the size of said particles is in the range from 0.1 to 2 microns.

4. A catalytic structure as recited in claim 1 wherein said plurality of metal nodules comprise a core of a first metal and a coating on said core of a second catalytic metal.

5. A catalytic structure as recited in claim 1 wherein said particles comprise catalytic particles.

6. A catalytic structure as recited in claim 5 wherein said catalytic particles are selected from the group consisting of $Al_2O_3$, $TiO_2$, $ZrO_2$, SiC and zeolites.

7. A method of forming a catalytic structure comprising the steps of:
   a. providing a metal substrate having a surface;
   b. forging into said surface a plurality of non-conductive discrete particles whereby said particles are partially embedded in said surface and extend above said one planar surface; and
   c. electrolytically depositing a catalyst material comprising a metal onto said surface between said discrete particles and extending above said surface.

8. A method as recited in claim 7 wherein said particles comprise aluminum oxide.

9. A method as recited in claim 7 wherein the size of said particles is in the range from 0.1 to 2 microns.

10. A method as recited in claim 7 wherein said plurality of metal nodules comprise a core of a first metal and a coating on said core of a second catalytic metal.

11. A method as recited in claim 7 wherein said particles comprise catalytic particles.

12. A method as recited in claim 11 wherein said catalytic particles are selected from the group consisting of $Al_2O_3$, $TiO_2$, $ZrO_2$, SiC and zeolites.

13. A method as recited in claim 7 wherein said step (b) of forging comprises the step of rotary brush embedment of said particles into said surface.

* * * * *